US012410889B2

(12) United States Patent
Castagnaro

(10) Patent No.: US 12,410,889 B2
(45) Date of Patent: Sep. 9, 2025

(54) TANK FOR TRANSPORTING CRYOGENIC FLUIDS

(71) Applicant: Esametal S.R.L., Cologna Veneta (IT)

(72) Inventor: Alberto Castagnaro, Cologna Veneta (IT)

(73) Assignee: Esametal S.R.L., Cologna Veneta (IT)

( * ) Notice: Subject to any disclaimer, the term of this patent is extended or adjusted under 35 U.S.C. 154(b) by 98 days.

(21) Appl. No.: 18/568,904

(22) PCT Filed: Jun. 3, 2022

(86) PCT No.: PCT/IT2022/050157
§ 371 (c)(1),
(2) Date: Dec. 11, 2023

(87) PCT Pub. No.: WO2022/259276
PCT Pub. Date: Dec. 15, 2022

(65) Prior Publication Data
US 2024/0271751 A1 Aug. 15, 2024

(30) Foreign Application Priority Data
Jun. 9, 2021 (IT) ........................ 102021000014975

(51) Int. Cl.
*F17C 1/14* (2006.01)

(52) U.S. Cl.
CPC ........ *F17C 1/14* (2013.01); *F17C 2201/0109* (2013.01); *F17C 2201/035* (2013.01);
(Continued)

(58) Field of Classification Search
CPC ................ F17C 1/14; F17C 2201/0109; F17C 2201/035; F17C 2201/056;
(Continued)

(56) References Cited

U.S. PATENT DOCUMENTS 2,256,679 A * 9/1941 Kornemann .......... F17C 13/126
220/592.27
3,425,234 A * 2/1969 Trepaud ................ F17C 13/126
62/45.1

(Continued)

FOREIGN PATENT DOCUMENTS

DE 3001922 7/1981
GB 726482 3/1955

(Continued)

OTHER PUBLICATIONS

International Search Report and the Written Opinion Dated Sep. 16, 2022 From the International Searching Authority Re. Application No. PCT/IT2022/050157. (14 Pages).

(Continued)

*Primary Examiner* — Robert J Hicks

(57) ABSTRACT

A tank (12) for transporting cryogenic fluids, comprising an outer container (10) and an inner container (11), having between them a compartment. The inner container (11) is adapted to contain a cryogenic fluid, which is brought outside the tank (12) through at least one cryogenic fluid withdrawal pipe (13), preferably made of stainless steel. The cryogenic fluid withdrawal pipe (13) is connected to the outer container (10) through a connection system (22) comprising a tubular bimetallic joint (14), which has an outer wall (15), adapted to be welded to the outer container (10) of the tank (12), and a central end or terminal (16), adapted to be welded to the cryogenic fluid withdrawal pipe (13).

10 Claims, 1 Drawing Sheet

(52) U.S. Cl.
CPC .................... *F17C 2201/056* (2013.01); *F17C 2203/0391* (2013.01); *F17C 2203/0629* (2013.01); *F17C 2203/0646* (2013.01); *F17C 2205/0311* (2013.01); *F17C 2205/0352* (2013.01); *F17C 2221/011* (2013.01); *F17C 2221/013* (2013.01); *F17C 2221/014* (2013.01); *F17C 2221/016* (2013.01); *F17C 2221/017* (2013.01); *F17C 2223/0161* (2013.01); *F17C 2223/047* (2013.01); *F17C 2260/012* (2013.01); *F17C 2270/0171* (2013.01)

(58) Field of Classification Search
CPC ........ F17C 2260/012; F17C 2270/0171; F17C 2203/0391; F17C 2203/0629; F17C 2203/0626; F17C 2203/0612; F17C 2203/0646; F17C 2221/011; F17C 2221/013; F17C 2221/014; F17C 2221/016; F17C 2221/017; F17C 2223/047; F17C 2223/046; F17C 2223/0161; F17C 2223/0153; F17C 2205/0311; F17C 2205/0317; F17C 2205/0302; F17C 2205/0358; F17C 2205/0352; B60P 3/22; B60P 3/2205; B60P 3/2215; B60K 15/063; B60K 2015/0636
USPC ........... 220/560.1, 560.04, 560.11, 586, 581; 137/505.22, 577, 590; 280/838, 839, 834, 280/831, 830
See application file for complete search history.

(56) References Cited

U.S. PATENT DOCUMENTS

| | | | | | |
|---|---|---|---|---|---|
| 3,433,384 | A | * | 3/1969 | Caruthers, Jr. | F16L 13/0281<br>220/560.04 |
| 3,613,934 | A | * | 10/1971 | Leonard | F17C 3/08<br>220/560.1 |
| 4,956,975 | A | * | 9/1990 | Gustafson | F17C 13/04<br>62/50.7 |
| 5,651,473 | A | | 7/1997 | Preston et al. | |
| 2008/0209915 | A1 | | 9/2008 | Harper et al. | |
| 2010/0213200 | A1 | * | 8/2010 | Deane | B65D 81/3802<br>220/592.2 |
| 2022/0034450 | A1 | * | 2/2022 | Katano | B29C 70/32 |

FOREIGN PATENT DOCUMENTS

| | | |
|---|---|---|
| GB | 932197 | 7/1963 |
| WO | WO 2021/026581 | 2/2021 |

OTHER PUBLICATIONS

Rapporto di Ricerca e l'Opinione Scritta [Search Report and Written Opinion] Dated Mar. 22, 2022 From the Ministero Dello Sviluppo Economico, Direzione Generale Sviluppo Produttivo e Competitivita, Ufficio Italiano Brevetti e Marchi Re. Application No. IT102021000014975. (10 Pages).

* cited by examiner

TANK FOR TRANSPORTING CRYOGENIC FLUIDS

The present invention generally refers to a tank for transporting cryogenic fluids.

The term cryogenic or cryogen fluid is often used to indicate substances that "generate cold" and those substances having a boiling temperature below −73° C. are considered as such.

Substances falling into this family are, for example, nitrogen, helium, argon, carbon dioxide, oxygen, ammonia.

Cryogenic fluids are usually transported inside tanks or containers at temperatures down to −196° C.; cryogenic tanks can be installed on refrigerated vehicles to feed their refrigeration system.

Furthermore, to prevent the transported fluid from heating up, the tank or container must be isolated as much as possible from the external environment and for this reason the container is normally made up of two tanks, positioned one inside the other, between which it is created the vacuum.

The fluid is contained in the inner tank and can come out through a pipe, which constitutes the fluid withdrawal pipe.

Such pipe starts from the inner tank and passes through the outer tank.

Other pipes start from the inner tank and pass through the outer tank with other functions, for example to fill the tank or to put the cryogenic fluid in communication with the system outside the tank.

In the case of cryogenic tanks installed on vehicles, there is a need to reduce the weight of the tank as much as possible in order to consequently increase the capacity of the vehicle.

Furthermore, especially in the case of tanks installed on refrigerated vehicles, there is a need to reduce the heat transmitted from the outer tank to the fluid withdrawal pipe.

The aim of the present invention is to produce a tank for transporting cryogenic fluids, made of aluminum in order to reduce its weight as much as possible, which can be installed on a refrigerated vehicle to feed its refrigeration system.

Another aim of the present invention is to produce a tank for transporting cryogenic fluids, which allows to reduce as much as possible the heat absorbed by the cryogenic fluid when it is withdrawn from the tank and therefore when it passes through the fluid withdrawal pipe.

A further aim of the present invention is to produce a tank for transporting cryogenic fluids, which is particularly efficient, practical and safe.

These and other aims are achieved by a tank for transporting fluids and, in particular, cryogenic liquids, according to the attached claim 1; other detailed technical characteristics of the tank object of the invention are specified in the subsequent dependent claims.

Further aims and advantages of the present invention will become clearer from the following description, relating to an exemplary and preferred, but not limiting, embodiment of the tank for transporting cryogenic fluids, according to the present invention, and from the attached figures, in which.

Figure 1:
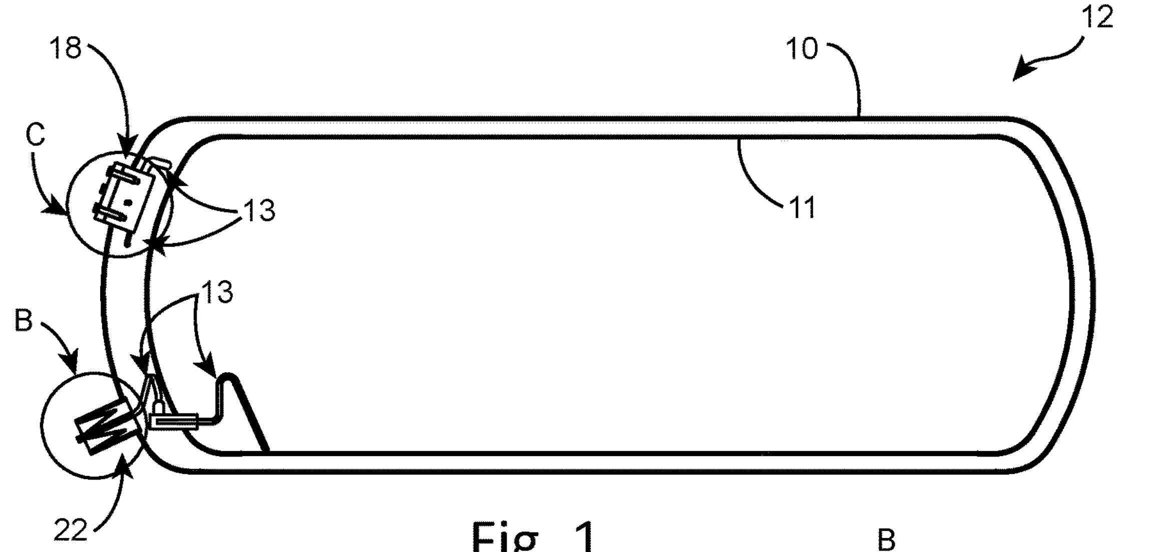
FIG. 1 is a partial longitudinal sectional view of the tank for transporting cryogenic fluids, according to the present invention.
Figure 2:
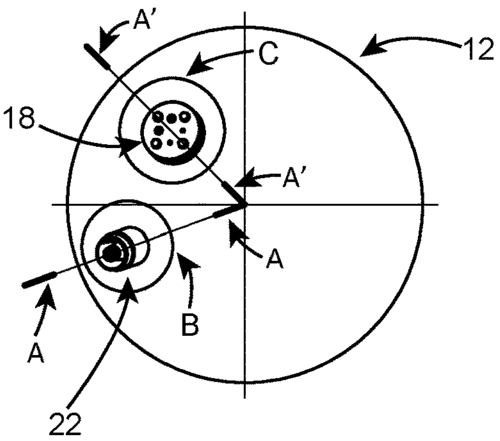
FIG. 2 is a side view of the tank in FIG. 1, according to the invention.

With reference to the aforementioned figures, the tank 12 for transporting cryogenic fluids, according to the present invention, is advantageously made of aluminum and comprises an outer aluminum container 10 inside which an inner aluminum container 11 is arranged; between the outer container 10 and the inner container 11 there is a compartment inside which a vacuum can be created.

The fluid is contained in the inner container 11 and can come out through at least one fluid withdrawal pipe 13, preferably made of stainless steel.

Other pipes or lines 13 are present to put the inside of the inner container 11 in communication with the outside of the tank 12.

A tank 12 of this type is advantageously used to be installed on a refrigerated vehicle to feed its refrigeration system and, in general, on refrigerated systems for industrial vehicles.

Figure 3:
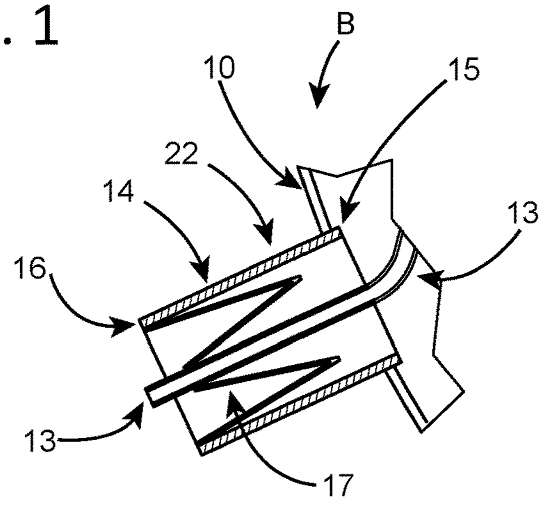
FIG. 3 is an enlarged sectional view taken along the line A-A of the detail indicated with B in FIGS. 1 and 2.

According to the present invention, to reduce as much as possible the heat absorbed by the cryogenic fluid when it is withdrawn from the tank 12 and, therefore, when it passes through the fluid withdrawal pipe 13, a particular system 22 is used (illustrated in detail in the attached FIG. 3) to connect the withdrawal pipe 13 to the outer container 10, reducing as much as possible the heat transmission.

In particular, the aforementioned connection system 22 comprises a tubular bimetallic joint 14, which has an aluminum end 15, adapted to be welded to the outer container 10 of the tank 12, and an end 16 made of stainless steel to be welded through the element of connection 17 to the fluid withdrawal pipe 13.

The connection system 22 includes a connection element 17 formed by concentric cones, which connects the bimetallic joint 14 to the fluid withdrawal pipe 13, whose geometry is suitably designed to mechanically support the pipe 13, reducing as much as possible the heat exchange with the external environment.

Figure 4:
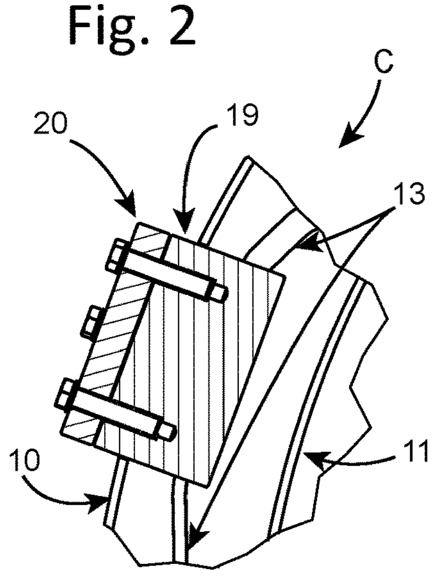
FIG. 4 is an enlarged sectional view taken along the line A'-A' of the detail indicated with C in FIGS. 1 and 2.
Figure 5:
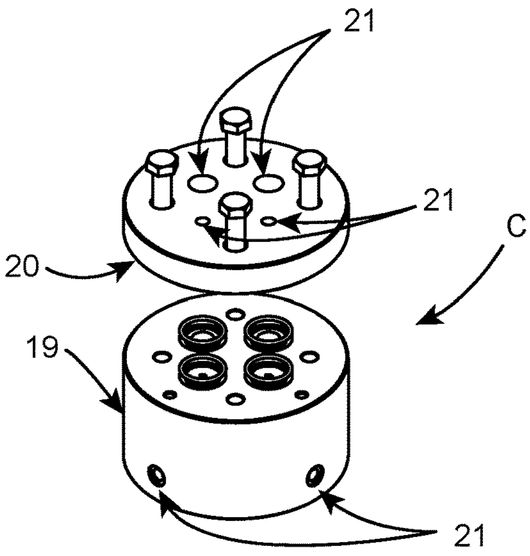
FIG. 5 is an enlarged and exploded view of the detail indicated with C in FIGS. 1 and 2.

Advantageously, the tank 12 also has a flanged connection 18 made with a first aluminum flange 19, placed partially inside the compartment existing between the inner container 11 and the outer container 10, and a second steel flange 20, coupled to the first flange 19 and placed outside the outer container 10 (as shown in detail in the attached FIGS. 4 and 5).

The flanged connection 18 has multiple holes 21 for connecting several lines or pipes 13; this allows with a single flanged connection 18 to pass through the outer container 10 with multiple lines or pipes 13 in order to put the inside of the tank 12 in communication with the outside.

From the above description the characteristics of the tank for transporting cryogenic fluids, which is the object of the present invention, are thus clear, as well as the advantages are clear.

In particular, the essential advantages are the following:

- a tank for transporting cryogenic fluids made of aluminum;
- being able to install the tank on a refrigerated vehicle to feed the refrigeration system;
- being able to reduce as much as possible the heat absorbed by the cryogenic fluid when it is withdrawn from the tank;
- a flanged connection for the passage of cryogenic fluids with multiple holes for the passage of multiple lines or pipes towards the outside.

Finally, it is clear that numerous other variations can be made to the tank in question, without thereby departing from the novelty principles inherent in the inventive idea, just as it is clear that, in the practical implementation of the invention, the materials, the shapes and the dimensions of the illustrated details may be any according to requirements and the same may be replaced with other equivalent ones.

The invention claimed is:

1. A tank for transporting cryogenic fluids, comprising an external container inside which an internal container is arranged, so that a compartment is provided between said external container and said internal container, wherein said internal container is configured to contain a cryogenic fluid which is brought outside the tank through at least one cryogenic fluid withdrawal pipe for withdrawing said cryogenic fluid, wherein said at least one cryogenic fluid withdrawal pipe is connected to said external container by means of a connection system, characterized in that said connection system comprises a tubular bimetallic joint which has an aluminum end configured to be welded to said external container of the tank, and a stainless steel end, configured to be welded through a connection element to at least one cryogenic fluid withdrawal pipe.

2. The tank as per claim 1, wherein said connection system includes a tubular bimetallic joint with one end in aluminum and the other end in stainless steel.

3. The tank as per claim 1, wherein said connection system includes said connection element the latter being formed by concentric cones which connects said tubular bimetallic joint to said at least one cryogenic fluid withdrawal pipe, said connection element being configured to mechanically support said at least one withdrawal pipe minimize heat exchange with the environment outside said tank.

4. The tank as per claim 1, wherein said tank is installed on a refrigerated vehicle and is adapted to feed a refrigeration system of said vehicle.

5. The tank as per claim 1, wherein said tank has a flanged connection which includes a first flange placed partially inside said compartment, and a second flange coupled to said first flange and placed outside said outer container.

6. The tank as per claim 5, wherein said first flange is made of aluminum.

7. The tank as per claim 5, wherein said second flange is made of steel.

8. The tank as per claim 5, wherein said flanged connection has a plurality of holes for connecting a plurality of pipes or lines putting the cryogenic fluid in communication with the outside of the tank.

9. The tank as per claim 1, characterized by being made of aluminum.

10. Use of a tank as per claim 1 for refrigerated systems of industrial vehicles.

* * * * *